(12) United States Patent
Stallings et al.

(10) Patent No.: US 8,375,316 B2
(45) Date of Patent: Feb. 12, 2013

(54) NAVIGATIONAL TRANSPARENT OVERLAY

(75) Inventors: Heath Stallings, Colleyville, TX (US);
Sok Y. Hwang, Dallas, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 429 days.

(21) Appl. No.: 12/650,672

(22) Filed: Dec. 31, 2009

(65) Prior Publication Data
US 2011/0161849 A1   Jun. 30, 2011

(51) Int. Cl.
*G06F 3/048* (2006.01)

(52) U.S. Cl. ........ 715/768; 715/808; 715/814; 715/822; 715/828; 715/841; 715/844

(58) Field of Classification Search ............. 715/768
See application file for complete search history.

(56) References Cited

U.S. PATENT DOCUMENTS

| | | | | |
|---|---|---|---|---|
| 5,801,953 | A * | 9/1998 | Thoma et al. | 702/68 |
| 7,246,329 | B1 * | 7/2007 | Miura et al. | 715/810 |
| 7,587,683 | B2 * | 9/2009 | Ito et al. | 715/823 |
| 2008/0244398 | A1 * | 10/2008 | Santos-Gomez et al. | 715/708 |
| 2009/0007012 | A1 * | 1/2009 | Mandic et al. | 715/810 |
| 2009/0273659 | A1 * | 11/2009 | Lee et al. | 348/14.02 |
| 2010/0058224 | A1 * | 3/2010 | Chai et al. | 715/784 |
| 2010/0169813 | A1 * | 7/2010 | Chang | 715/767 |
| 2010/0275143 | A1 * | 10/2010 | Fu et al. | 715/768 |
| 2011/0138319 | A1 * | 6/2011 | Sidman | 715/781 |

OTHER PUBLICATIONS

Webopedia, "What is display?—A Word Definition From the Webopedia Computer Dictionary," Oct. 25, 2008, Jupitermedia Corp., Available http://web.archive.org/web/20081025212253/http://www.webopedia.com/TERM/d/display.html.*

* cited by examiner

*Primary Examiner* — Alvin Tan (57) ABSTRACT

A method performed on a user device includes displaying a source user interface that includes one or more selectable objects; receiving a user input with respect to one of the one or more selectable objects of the source user interface; determining, in response to the user input, whether a lower level interface, with respect to the one of the one or more selectable objects of the source user interface, exists; displaying the lower level interface, when it is determined that the lower level interface exists for the one of the one or more selectable objects, where the lower level interface is displayed as a transparent overlay representative of a user interface that would be displayed if the user were to select from or access the source user interface; determining whether another user input is received, where the other user input indicates that the lower level interface is to be activated; and displaying the lower level interface as an opaque overlay, when it is determined that the other user input is received.

20 Claims, 9 Drawing Sheets

NAVIGATIONAL TRANSPARENT OVERLAY

BACKGROUND

Touch screens or touch displays are becoming more and more prevalent in consumer devices, such as, for example, mobile phones, personal digital assistants (PDAs), web browsing devices, and Global Positioning System (GPS) devices. Users are able to navigate and access data and applications stored on consumer devices by performing various gestures and movements, and/or other types of contact on the touch screen.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "source GUI" or "source user interface" is intended to be broadly interpreted to include a GUI that is active and/or currently displayed. The source GUI may correspond to, for example, a user interface associated with an application or a user interface associated with a device. In a window environment, there may be multiple windows (corresponding to GUIs) which may be opened. For example, one window may hide (partially or wholly) another window. The partially or wholly hidden window may also correspond to a source GUI.

The term "lower level GUI" is intended to be broadly interpreted to include, for example, a GUI that may be accessed via a source GUI. For example, a user may select from, interact with, access, and/or navigate through the source GUI to reach the lower level GUI.

As will be described herein, a user device may include applications, a user interface, or the like, which provide transparent overlays with which a user may utilize. The transparent overlays may be implemented as graphical user interfaces (GUIs). For example, typically, an application includes various types of GUIs (e.g., menus, buttons, icons, windows, tabs, visual indicators, etc.). However, the application's GUIs typically provide little to no information with respect to a lower level GUI associated with a source GUI. Rather, the user may have to actually select the source GUI in order to access a lower level GUI. However, in the implementations described herein, the user may see the lower level GUI without actually selecting the source GUI. For example, in one implementation, the user may provide a user input (e.g., the user touches a touch screen) with respect to the source GUI to trigger an appearance of a transparent overlay representative of the lower level GUI. The user may provide another user input to activate the transparent overlay to permit the user to select from, interact with, access, and/or navigate through the lower level GUI.

Since the overlay is transparent, the user may still be able to see the source GUI, as well as the lower level GUI. The user may determine, based on this visualization, whether the lower level GUI is a navigational target to which the user wishes to proceed. In the instance that the user does not wish to select from, interact with, access, and/or navigate through the transparent overlay (i.e., the lower level GUI0, in one implementation, the transparent overlay may appear to the user for a relatively short time period (e.g., under one or two seconds) and then disappear. In other words, the transparent overlay may appear based on the user's initial input with respect to the source GUI and automatically disappear after the short period time expires and the user does not activate the transparent overlay. Alternatively, in the instance that the user wishes to select from, interact with, access, and/or navigate through the transparent overlay (i.e., the lower level GUI), the user may activate the transparent overlay. For example, in one implementation, another user input, which corresponds to activating the transparent overlay, may cause the transparent overlay to change to an opaque overlay. The user may then select from, interact with, access, and/or navigate through the lower level GUI. While descriptions herein may refer generally to an inactive transparent overlay and an active opaque overlay, in other implementations, varying levels of transparency and/or translucency may be implemented for inactive and active overlays.

Various parameters associated with the transparent overlay may be user-configurable. For example, a size of the transparent overlay, a transparency level of the transparent overlay, a time period with which the transparent overlay appears and then disappears (assuming the user does not cause the transparent overlay to transition to an opaque overlay), and/or a position of the transparent overlay may be user-configurable. In one implementation, the size of the transparent overlay may correspond to the actual size of the lower level GUI normally provided by the application, the user interface, or the like.

Figure 1:
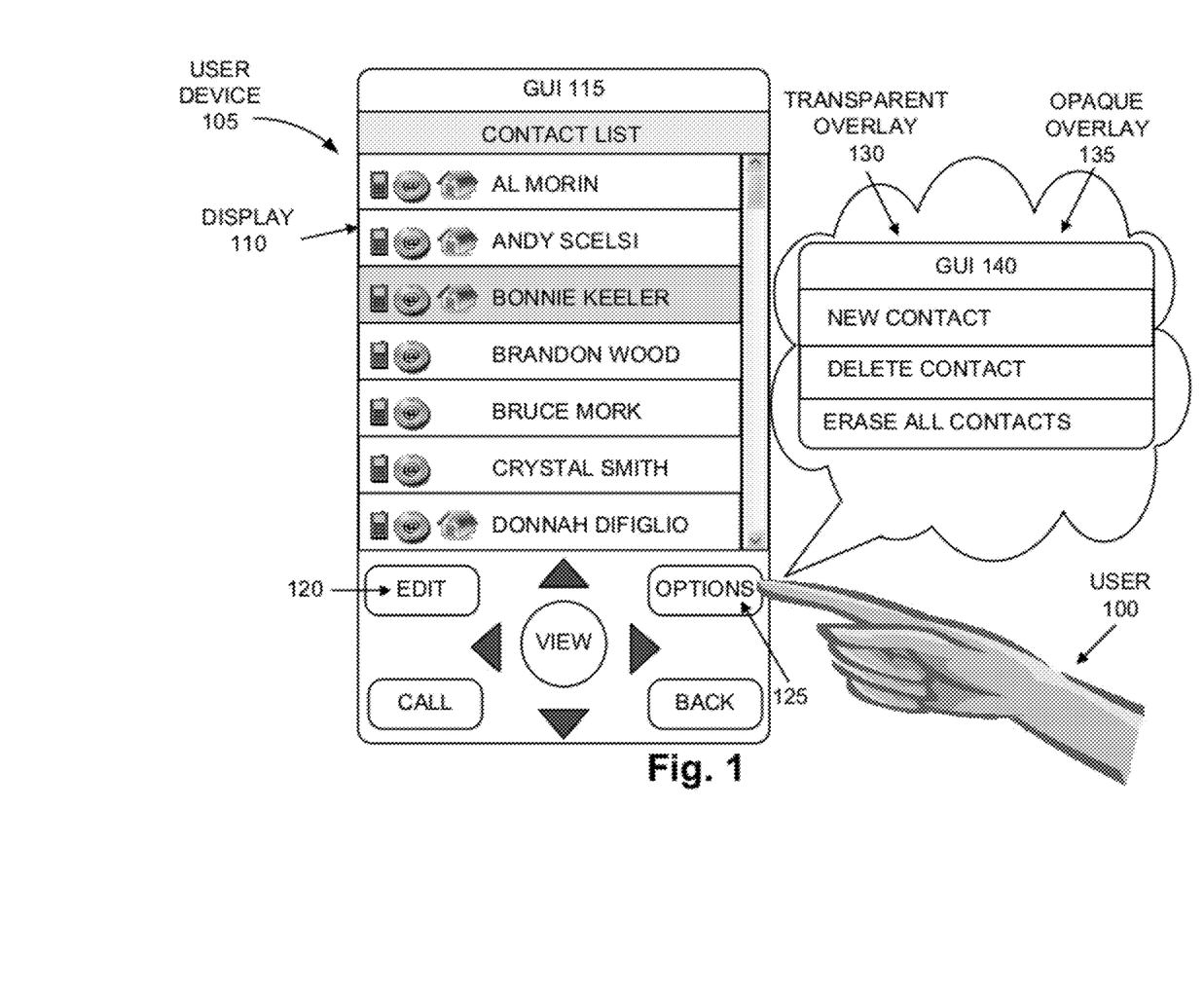
FIG. 1 is a diagram illustrating an exemplary scenario in which an exemplary transparent overlay may be utilized by a user.

FIG. 1 is a diagram illustrating an exemplary scenario in which an exemplary transparent overlay may be utilized by the user. As illustrated, a user 100 may be operating a user device 105 that includes a display 110. Display 110 may include a touch screen. Display 110 may display a GUI 115. In this example, GUI 115 corresponds to a contact list. For purposes of discussion, assume user 100 recently broke-up with his girlfriend and wishes to delete his girlfriend's contact information from the contact list. However, user 100 is unsure whether her contact information may be deleted by accessing an edit button 120 or an options button 125. In this example, user 100 touches options button 125 and a transparent overlay 130 appears. Although not illustrated as such, in FIG. 1, transparent overlay 130 may appear as a transparent overlay presented on top of GUI 115 on display 110. Transparent overlay 130 may include a GUI 140 that indicates an option to delete a contact. User 100 may notice the information provided by transparent overlay 130 and may move his finger on transparent overlay 130. Based on user's 100 touch and activation of transparent overlay 130, transparent overlay 130 may transform from a transparent overlay to an opaque overlay 135. User 100 may select the delete contact option from opaque overlay 135.

As a result of the foregoing, user 100 may be able to operate the user device in a more efficient manner based on the user's 100 ability to see transparent overlays of lower level GUIs.

Since implementations have been broadly described, variations to the above implementations will be discussed further below.

Figure 2:
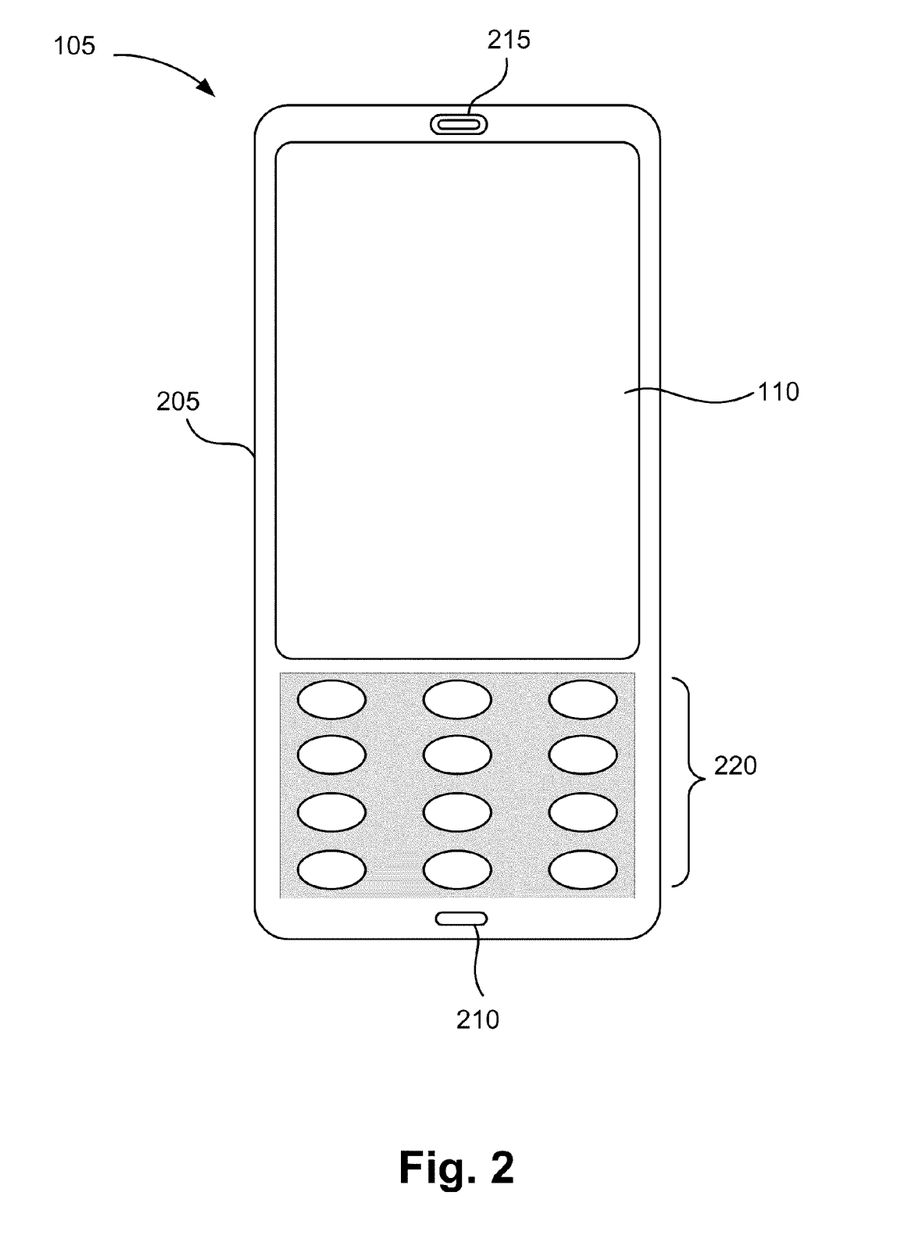
FIG. 2 is a diagram illustrating an exemplary user device.

FIG. 2 is a diagram of an exemplary user device 105 in which the transparent overlay scheme described herein may be implemented. The term "user device," as used herein, is intended to be broadly interpreted to include a variety of devices (e.g., a consumer device, an entertainment device, a medical device, a military device, etc.). For example, user device 105 may correspond to a portable device, a mobile device, a handheld device, or a stationary device. By way of example, but not limited thereto, user device 105 may correspond to a wireless telephone (e.g., a smart phone or a cellular phone), a PDA, a pervasive computing device, a computer (e.g., a desktop computer, a laptop computer, a palmtop computer), an Internet Protocol (IP) phone, a music playing device, a web browsing device, a personal navigation device (PDN) (e.g., a Global Positioning System (GPS) navigation device), a multimedia playing device, a gaming device, a vehicle-based device, and/or some other type of user device.

As illustrated in FIG. 2, user device 105 may include a housing 205, a microphone 210, a speaker 215, a keypad 220, and a display 110. In other embodiments, user device 105 may include fewer, additional, and/or different components, and/or a different arrangement of components than those illustrated in FIG. 2 and described herein. For example, user device 105 may include a camera, a video capturing component, and/or a flash for capturing images and/or video. Additionally, or alternatively, user device 105 may not include, for example, microphone 210 and/or keypad 220.

Housing 205 may include a structure to contain components of user device 105. For example, housing 205 may be formed from plastic, metal, or some other material. Housing 205 may support microphone 210, speakers 215, keypad 220, and display 110.

Microphone 210 may transduce a sound wave to a corresponding electrical signal. For example, the user may speak into microphone 210 during a telephone call or to execute a voice command. Speaker 215 may transduce an electrical signal to a corresponding sound wave. For example, the user may listen to music, listen to a calling party, or listen to other auditory signals through speaker 215.

Keypad 220 may provide input into user device 105. Keypad 220 may include a standard telephone keypad, a QWERTY keypad, and/or some other type of keypad. Keypad 220 may also include one or more special purpose keys. The user may utilize keypad 220 as an input component to user device 105. For example, the user may enter information, such as alphanumeric text, or access some data or invoke some function or operation.

Display 110 may output visual content and may operate as an input component (e.g., a touch screen (also known as a touch display)). Display 110 may be implemented according to a variety of display technologies, including but not limited to, a liquid crystal display (LCD), a plasma display panel (PDP), a field emission display (FED), a thin film transistor (TFT) display, or some other type of display technology. Additionally, display 110 may be implemented according to a variety of sensing technologies, including but not limited to, capacitive sensing, surface acoustic wave sensing, resistive sensing, optical sensing, pressure sensing, infrared sensing, gesture sensing, etc. Display 110 may be implemented as a single-point input device (e.g., capable of sensing a single touch or point of contact) or a multipoint input device (e.g., capable of sensing multiple touches or points of contact that occur at substantially the same time).

Display 110 may also include an auto-rotating function that automatically orients content being displayed in correspondence to an orientation of display 110 and/or user device 105. For example, the auto-rotating function may automatically rotate content in a portrait mode or a landscape mode in correspondence to the orientation of display 110 and/or user device 105.

Display 110 may display text, images, and/or video to the user. Display 110 may also display a user interface (e.g., a GUI) of user device 105 or a user interface of some other device in which user device 105 controls, a user interface associated with applications, or the like. The user may utilize his or her finger or some other instrument (e.g., a stylus) to interact with display 110 (and user device 105).

Figure 3:
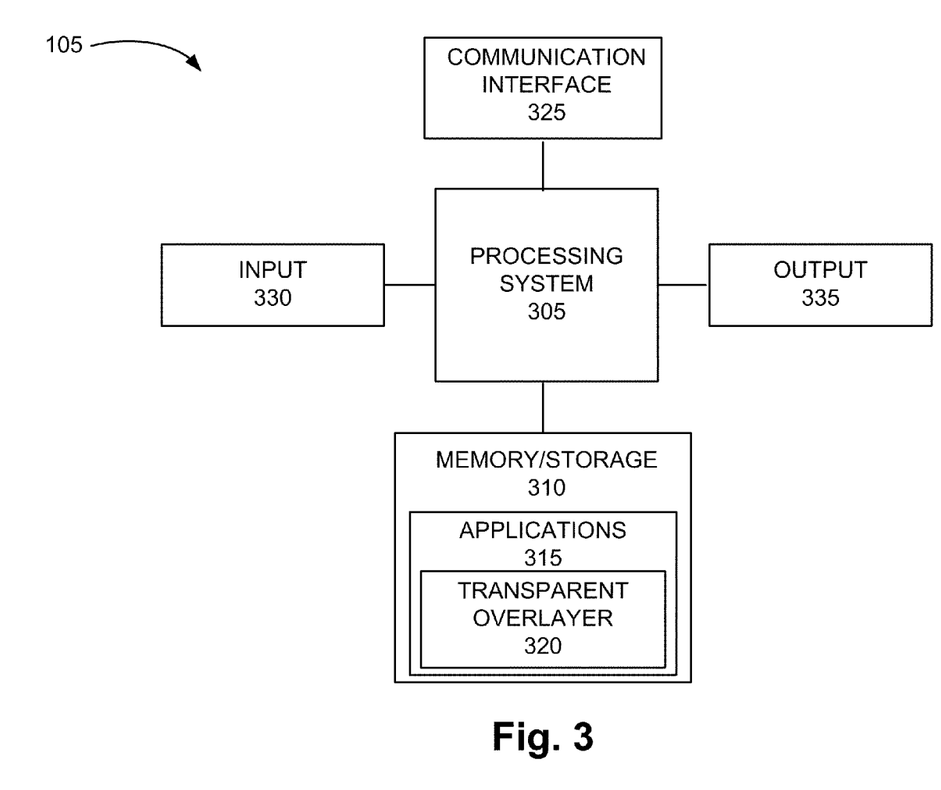
FIG. 3 is a diagram illustrating exemplary components of the user device.

FIG. 3 is a diagram illustrating exemplary components of user device 105. As illustrated, user device 105 may include a processing system 305, memory/storage 310 including applications 315 and transparent overlayer 320, a communication interface 325, an input 330, and an output 335. In other implementations, user device 105 may include fewer, additional, and/or different components, and/or a different arrangement of components than those illustrated in FIG. 3 and described herein. For example, user device 105 may not include communication interface 325 and/or secondary storage (e.g., associated with memory/storage 310). Additionally, in other implementations, some functions described as being performed by a particular component may be performed by a different component, or some combination thereof.

Processing system 305 may include one or more processors, microprocessors, data processors, co-processors, network processors, application specific integrated circuits (ASICs), controllers, programmable logic devices (PLDs), chipsets, field programmable gate arrays (FPGAs), and/or some other component that may interpret and/or execute instructions and/or data. Processing system 305 may control the overall operation, or a portion thereof, of user device 105, based on, for example, an operating system (not illustrated) and/or various applications (e.g., applications 315).

Processing system 305 may access instructions from memory/storage 310, from other components of user device 105, and/or from a source external to user device 105 (e.g., a network or another device). Processing system 305 may provide for different operational modes associated with user device 105. Additionally, or alternatively, processing system 305 may simultaneously operate in multiple operational modes.

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, or the like. A computer-readable medium may correspond to, for example, a physical memory device or a logical memory device. A logical memory device may include memory space within a single physical memory device or spread across multiple physical memory devices.

Memory/storage 310 may store data, application(s), and/or instructions related to the operation of user device 105. For example, memory/storage 310 may include a variety of applications 315, such as, an e-mail application, a telephone application, a camera application, a voice recognition application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Transparent overlayer 320 may provide transparent overlays with which the user may utilize. Transparent overlayer 320 may detect when a user's input is located within an area, with respect to a GUI associated with applications 315, a user interface of user device 105, or the like, which may provide a transparent overlay. The transparent overlay may correspond to a lower level GUI in relation to a source GUI with which the user is currently utilizing and/or is being displayed to the user.

In one implementation, transparent overlayer 320 may be implemented at an application level. That is, for example, applications 315 may provide for transparent overlayer 320 processes, as described herein. In another implementation, transparent overlayer 320 may be implemented at a system level (e.g., in an operating system (OS)). Transparent overlayer 320 will be described in greater detail below.

Communication interface 325 may permit user device 105 to communicate with other devices, networks, and/or systems. For example, communication interface 325 may include some type of wireless and/or wired interface.

Input 330 may permit the user and/or another device to input information into user device 105. For example, input 330 may include a button (e.g., keypad 220), a knob, a touchpad, an input port, a display (e.g., display 110), microphone 210, voice recognition logic, fingerprint recognition logic, retinal scan logic, a web cam, a camera, and/or some other type of input component. Output 335 may permit user device 105 to output information to the user and/or another device. For example, output 335 may include a display (e.g., display 110), light emitting diodes (LEDs), an output port, speaker 215, a vibration mechanism, and/or some type of output component.

As described herein, user device 105 may perform certain operations in response to processing system 305 executing software instructions contained in a computer-readable medium, such as memory/storage 310. The software instructions may be read into memory/storage 310 from another computer-readable medium or from another device via communication interface 325. The software instructions contained in memory/storage 310 may cause processing system 305 to perform processes described herein. Alternatively, hardwired circuitry may be used in place of or in combination with software instructions to implement processes described herein. Thus, implementations described herein are not limited to any specific combination of hardware circuitry and software.

As previously described user device 105 may include transparent overlayer 320. Transparent overlayer 320 may provide transparent overlays, which are displayed on display 110, to the user based on the user's interaction with a GUI of user device 105. Described below are the functional components of transparent overlayer 320.

Figure 4:
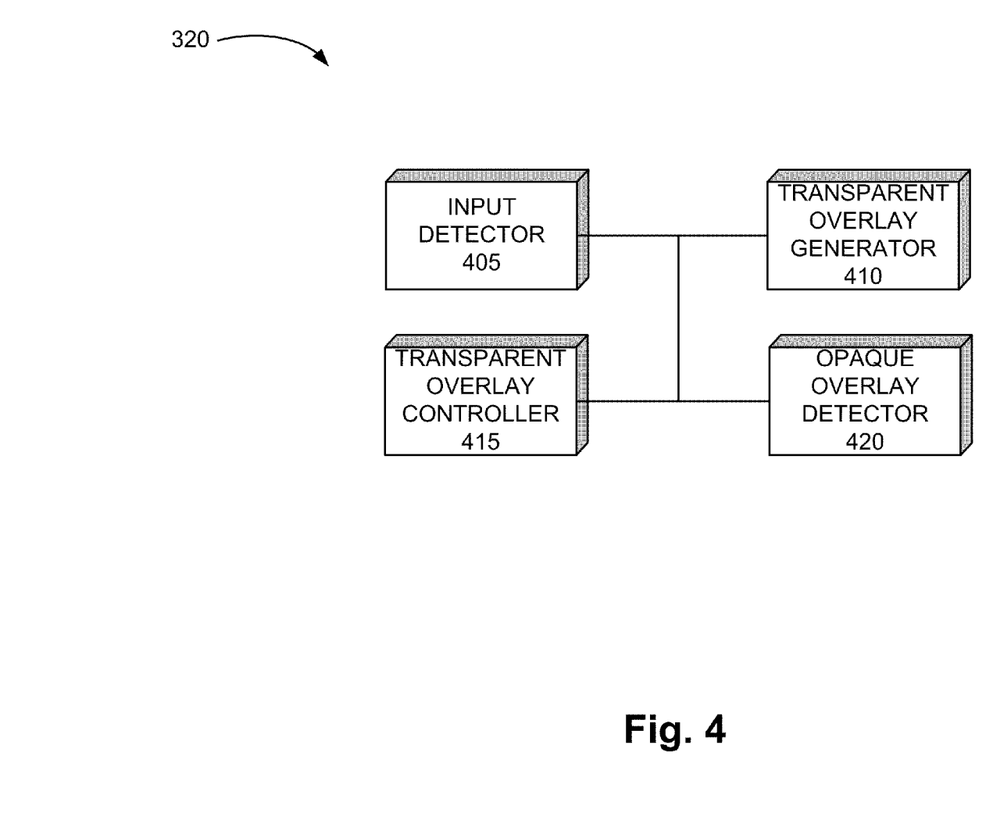
FIG. 4 is a diagram illustrating exemplary functional components of a transparent overlayer.

FIG. 4 is a diagram illustrating exemplary functional components of transparent overlayer 320. As illustrated in FIG. 4, transparent overlayer 320 may include an input detector 405, a transparent overlay generator 410, a transparent overlay controller 415, and an opaque overlay detector 420. Input detector 405, transparent overlay generator 410, transparent overlay controller 415, opaque overlay detector 420 may be implemented as a combination of hardware and software based on the components illustrated and described with respect to FIG. 3.

Input detector 405 may detect when the user's input (e.g., the user touching display 110) with respect to a source GUI should cause a transparent overlay to appear. For example, as previously described, an application (e.g., applications 315) or a user interface (e.g., associated with user device 105) may include various types of GUIs (e.g., menus, buttons, icons, tabs, windows, visual indicators, etc.). In one implementation, input detector 405 may cooperatively operate with display 110 and the sensing technology (e.g., capacitive sensing, surface acoustic wave sensing, etc.) associated therewith.

Input detector 405 may receive the user input information and determine whether a lower level GUI exists in relation to the source GUI. For example, the user input information may include a file, a name of the file, and/or data that corresponds to the source GUI. Input detector 405 may determine whether a lower level GUI exists in relation to the source GUI based on the user input information. For example, input detector 405 may obtain execution flow information associated with the source GUI. The execution flow information may include, among other things, the file(s), the name(s) of files, and/or data associated with a lower level GUI as if the user were to select, navigate, and/or access the source GUI. When the lower level GUI exists, input detector 405 may determine that the transparent overlay may appear. Input detector 405 may provide lower level GUI information to transparent overlay generator 410. When the lower level GUI does not exist, input detector 405 may determine that the transparent overlay will not appear.

It will be appreciated, depending on the application, the OS, the user interface, etc., and how the application, the OS, the user interface, etc., is coded and/or operates, the type of information input detector 405 may obtain to determine whether the lower level GUI exists may vary from one device or system to another.

Transparent overlay generator 410 may generate the transparent overlay. In one implementation, transparent overlay generator 410 may generate the transparent overlay based on the lower level GUI information provided by input detector 405. The transparent overlay may correspond to the lower level GUI that the user may access via the source GUI. The lower level GUI may be associated with, for example, applications 315 or a user interface (e.g., associated with user device 105, or another device).

Transparent overlay controller 415 may control various parameters associated with the transparent overlay. For example, transparent overlay controller 415 may control a size of the transparent overlay, a transparency level of the transparent overlay, a time period with which the transparent overlay appears and then disappears (assuming the user does not cause the transparent overlay to transition to an opaque overlay), and/or a position of the transparent overlay (e.g., above, below, to a side of, or over the source GUI). Other parameters (e.g., in addition to a time period) may be included as activation/deactivation thresholds for the transparent overlay. For example, proximity of a user's finger (or another object) to display 110, a press/touch distinction, audible commands, eye movement and/or brain activity may also cause the transparent overlay to appear, disappear, and/or activate. One or more of these parameters may be user-configurable.

Opaque overlay detector 420 may cause the transparent overlay to transition to an opaque overlay. For example, the user may interact with display 110 in a manner that indicates to opaque overlay detector 420 that the user wishes to select from, interact with, access, and/or navigate through the transparent overlay. In one implementation, the user may touch or perform some other type of movement or gesture on the transparent overlay to cause the transparent overlay to transition to the opaque overlay. Additionally, or alternatively, the user may touch or perform some other type of movement or gesture elsewhere on display 110 (i.e., not necessarily on the transparent overlay) to cause the transparent overlay to transition to the opaque overlay. As previously described, when the overlay becomes opaque, the user may, for example, select from, interact with, access, and/or navigate through, the lower level GUI.

Although FIG. 4 illustrates exemplary functional components of transparent overlayer 320, in other implementations, transparent overlayer 320 may include additional, fewer, different, and/or differently arranged functional components than those illustrated in FIG. 4 and described herein. Additionally, or alternatively, one or more operations described as being performed by a particular functional component may be performed by one or more other functional components, in addition to or instead of the particular functional component.

FIGS. 5A-5D are diagrams illustrating exemplary operations performed by transparent overlayer 320 to provide transparent overlays. For example, the exemplary operations may be performed by input detector 405, transparent overlay generator 410, transparent overlay controller 415, and opaque overlay detector 420.

Figure 5A:
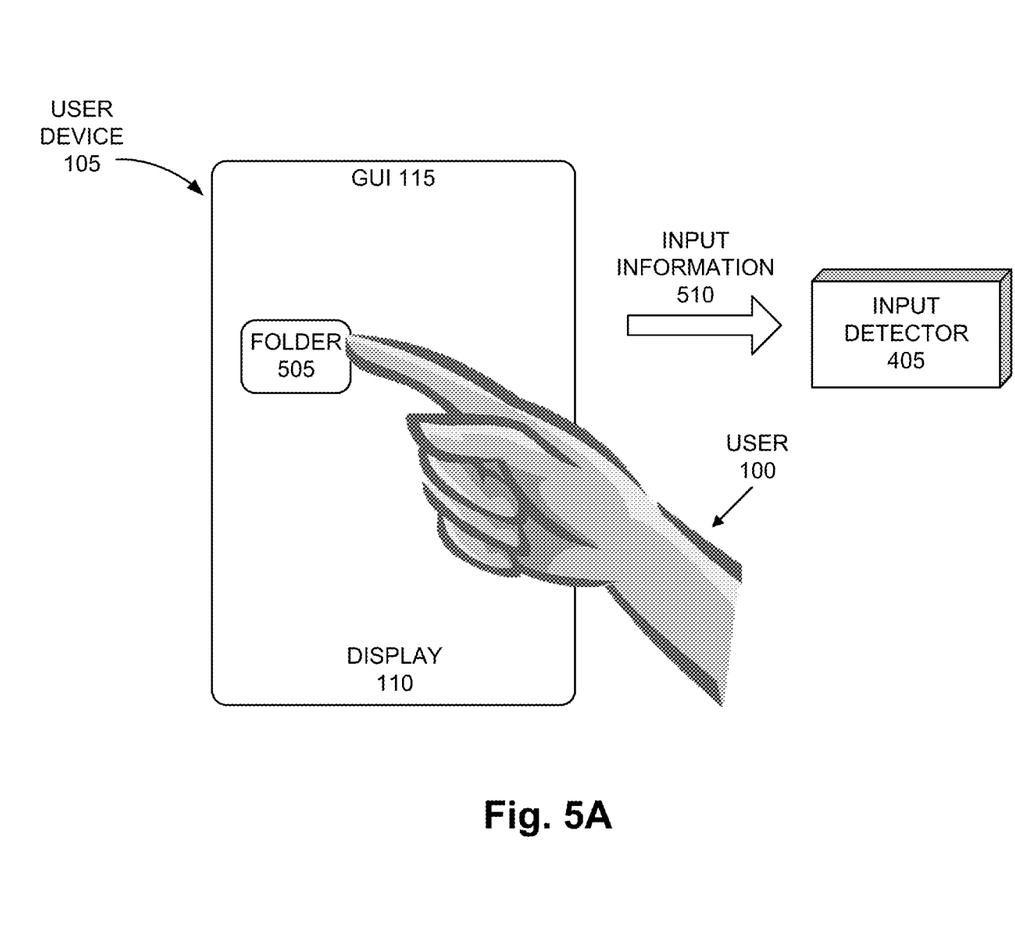
FIGS. 5A-5D are diagrams illustrating exemplary operations performed by the transparent overlayer.

Referring to FIG. 5A, user 100 may be operating user device 105. User 100 may be interacting with display 110 and may touch folder 505 of GUI 115. As illustrated, in response to user's 100 touch of folder 505, input information 510 may be provided to input detector 405. For example, input information 510 may include a file, a name of a file, and/or data associated with folder 505 that corresponds to the GUI of folder 505. Input detector 405 may determine whether a lower level GUI exists in relation to a source GUI (e.g., folder 505) based on input information 510. For example, input detector 405 may obtain execution flow information associated with folder 505. The execution flow information may correspond to the file(s), name(s) of files, and/or data associated with the lower level GUI as if user 100 were to select from, interact with, access, and/or navigate through folder 505. It may be assumed, in this example, that input detector 405 determines that a lower level GUI exists.

Figure 5B:
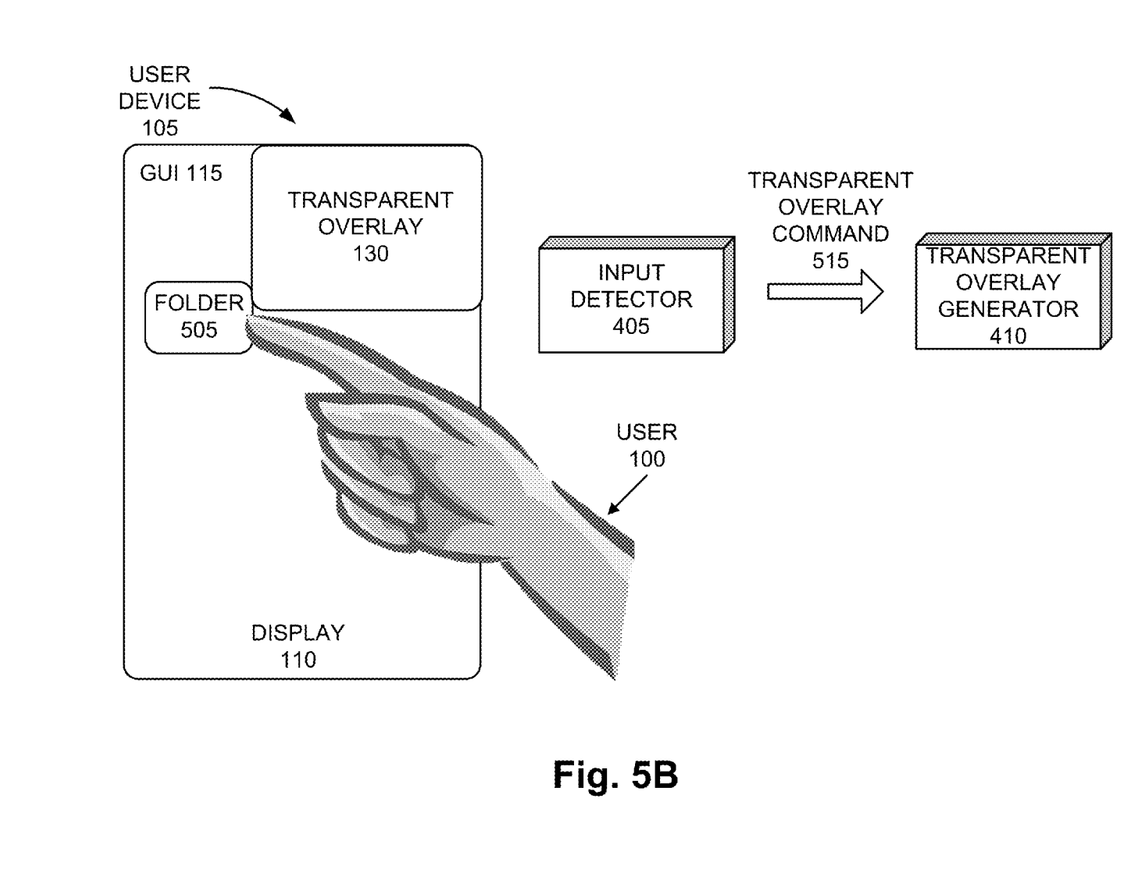

Referring to FIG. 5B, when input detector 405 determines that the lower level GUI exists, input detector 405 may issue a transparent overlay command 515 to transparent overlay generator 410. Transparent overlay command 510 may include an indication to transparent overlay generator 410 to provide the transparent overlay representative of the lower level GUI associated with folder 505. Transparent overlay command 510 may include, for example, pointers to and/or names of file(s), and/or data, associated with the lower level GUI. As illustrated in FIG. 5B, transparent overlay generator 410 may generate transparent overlay 130 based on transparent overlay command 515. Transparent overlay 130 may be displayed to user 100 on display 110, as illustrated in FIG. 5B.

Figure 5C:
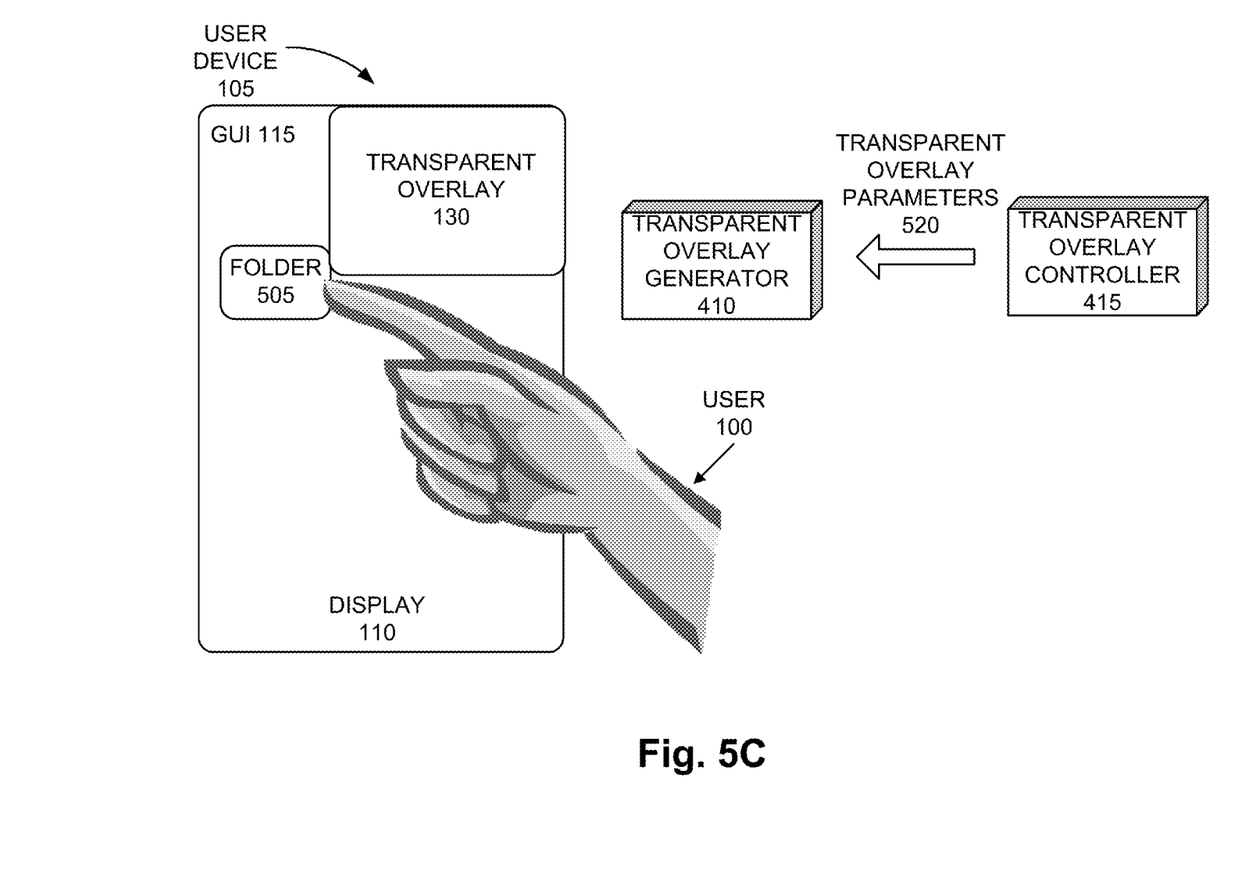

Referring to FIG. 5C, transparent overlay controller 415 may control transparent overlay parameters 520 associated with transparent overlay 130, while transparent overlay 130 is being displayed on display 110. For example, transparent overlay controller 415 may control a size of transparent overlay 130, a transparency level of transparent overlay 130, a time period with which transparent overlay 130 appears and then disappears, and/or a position of transparent overlay 130 (e.g., above folder 130, below folder 130, to a side of folder 130, or over folder 130). As previously described, one or more of transparent overlay parameters 520 may be user-configurable.

Figure 5D:
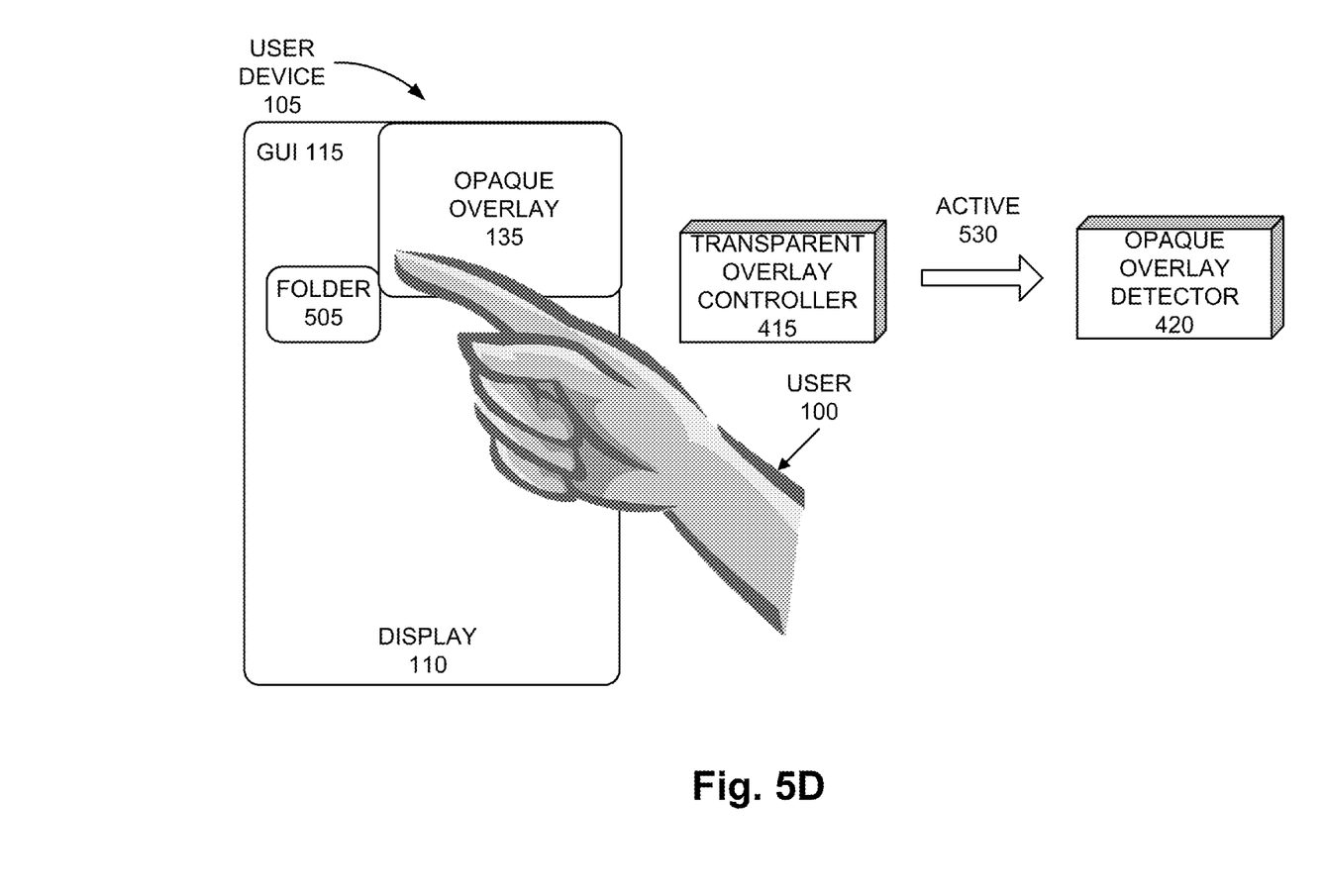

Referring to FIG. 5D, opaque overlay detector 420 may cause transparent overlay 130 to transition to opaque overlay 135. It may be assumed, in this example, that user 100 interacts with display 110 (i.e., provides another user input) in a manner that indicates to opaque overlay detector 420 that the user wishes to select from, interact with, access, and/or navigate through transparent overlay 130 (i.e., the lower level interface). In one implementation, user 100 may touch or perform some other type of movement or gesture on transparent overlay 130 to cause transparent overlay 130 to transition to opaque overlay 135. Additionally, or alternatively, user 100 may touch or perform some other type of movement or gesture elsewhere on display 110 to cause transparent overlay 130 to transition to opaque overlay 135. As previously described, when the overlay becomes opaque, user 100 may, for example, select from, interact with, access, and/or navigate through, the lower level interface (i.e., opaque overlay 135).

As further illustrated in FIG. 5D, in one implementation, transparent overlay controller 415 may provide opaque overlay detector 420 an indication that transparent overlay 130 is active (i.e., is appearing). Opaque overlay detector 420 may detect and cause transparent overlay 130 to transition to opaque overlay 135 only when user's 100 touch, gesture, or the like, occurs when transparent overlay 130 is active 530 (i.e., is displayed to user 100).

Although FIGS. 5A-5D illustrate exemplary operations associated with transparent overlayer 320, in other implementations, additional, fewer, and/or different operations may be performed other than those described and illustrated in FIG. 5A-5D.

Figure 6:
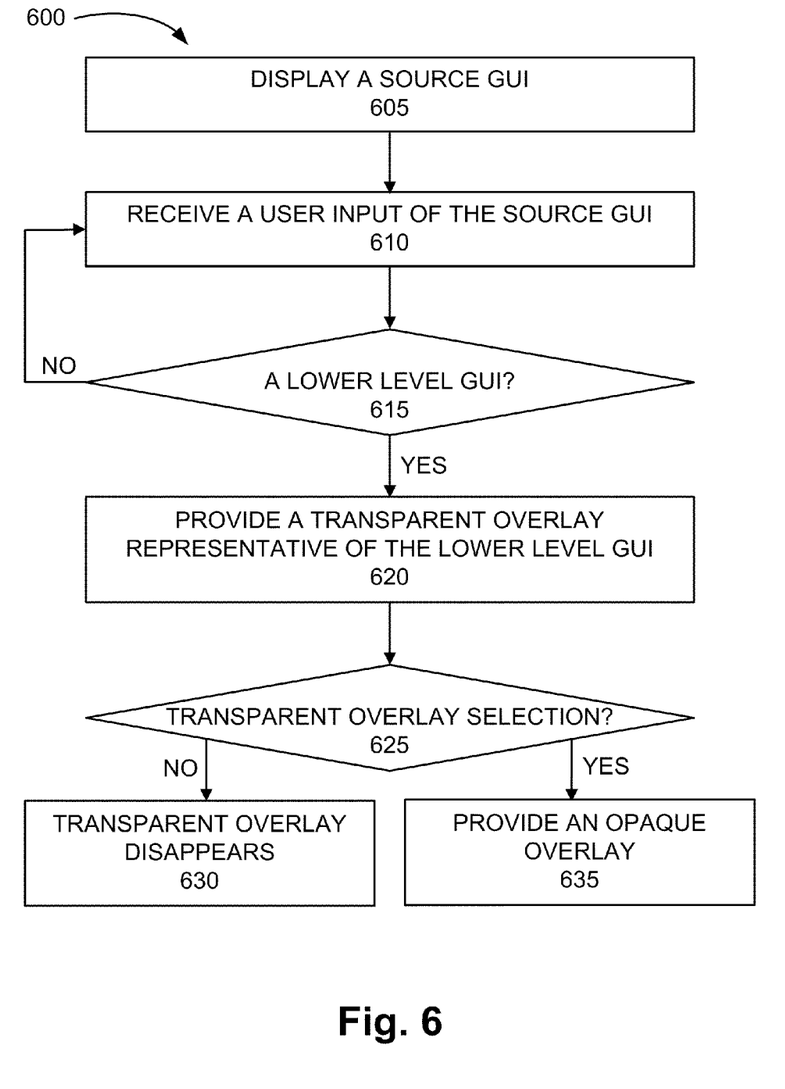
FIG. 6 illustrates a flow diagram of an exemplary process for providing transparent overlays with which a user may utilize.

FIG. 6 illustrates a flow diagram of an exemplary process 600 for providing transparent overlays with which a user may utilize. Process 600 may be performed by user device 105.

Process 600 may include displaying a source GUI (block 605). For example, as previously described, user device 105 may display a source GUI. The source GUI may correspond to, for example, an application (e.g., applications 315), a user interface of user device 105, or a user interface of another device. The source GUI may be displayed on display 110. In one implementation, display 110 may include a touch screen. The source GUI may include one or more selectable objects (e.g., a menu, a button, a tab, a window, or some other type of visual indicator).

A user input of the source GUI may be received (block 610). For example, as previously described, the user may interact with the source GUI displayed on display 110. The user may touch an area of display 110 using, for example, his or her finger or an instrument (e.g., a stylus). The user may touch one of the selectable objects included with the source GUI. Based on the user's touch on display 110 and corresponding interaction with the source GUI, input information 510 may be provided to input detector 405. Input information 510 may include, for example, a file, a name of a file, and/or data associated with the source GUI (e.g., an object of the source GUI) with which the user input corresponds.

It may be determined whether a lower level GUI exists with respect to the source GUI associated with the user's input (block 615). For example, as previously described, input detector 405 may determine whether a lower level GUI exists with respect to the source GUI (e.g., on object of the source GUI), associated with the user input, based on input information 510. For example, input detector 405 may obtain execution flow information associated with the source GUI. The execution flow information may correspond to the file(s), name(s) of files, and/or data associated with the lower level GUI as if the user were to select from, interact with, access, and/or navigate through the source GUI (e.g., the selected object of the source GUI).

If it is determined that the lower level GUI does not exist (block 615—NO), process 600 may return to block 610. For example, the user may continue to interact with the source GUI and input detector 405 may receive additional input information 510. Additionally, the source GUI may still be displayed (e.g., in block 605).

If it is determined that the lower level GUI does exist (block 615—YES), a transparent overlay representative of the lower level GUI may be provided (block 620). For example, as previously described, input detector 405 may issue a transparent overlay command 515 to transparent overlay generator 410. Transparent overlay command 510 may include an indication to transparent overlay generator 410 to provide the transparent overlay representative of the lower level GUI, which is associated with the source GUI. Transparent overlay command 510 may include, for example, pointers to and/or name(s) of file(s), and/or data, associated with the lower level GUI. Transparent overlay generator 410 may generate transparent overlay 130 based on transparent overlay command 515. Transparent overlay 130 may be displayed on display 110.

Additionally, as previously described, transparent overlay controller 415 may control transparent overlay parameters 520 associated with transparent overlay 130, while transparent overlay 130 is being displayed on display 110. For example, transparent overlay controller 415 may control a size of transparent overlay 130, a transparency level of transparent overlay 130, a time period with which transparent overlay 130 appears and then disappears, and/or a position of transparent overlay 130 (e.g., above, below, to a side of, or over the source GUI). As previously described, one or more of transparent overlay parameters 520 may be user-configurable.

It may be determined whether a transparent overlay selection occurs (block 625). For example, as previously described, transparent overlay controller 415 may provide to opaque overlay detector 420, an indication that transparent overlay 130 is active 530 (i.e., is displayed on display 110). Opaque overlay detector 420 may detect and cause transparent overlay 130 transition to opaque overlay 135 only when the user's touch, gesture, or the like, occurs when transparent overlay 130 is active 530. In one implementation, the user may touch or perform some other type of movement or gesture on transparent overlay 130 to cause transparent overlay 130 to transition to opaque overlay 135. Additionally, or alternatively, the user may touch or perform some other type of movement or gesture elsewhere on display 110 to cause transparent overlay 130 to transition to opaque overlay 135.

If it is determined that a transparent overlay selection does not occur (block 625—NO), the transparent overlay may disappear (block 630). For example, transparent overlay controller 415 may cause transparent overlay 130 to disappear based on transparent overlay parameters 520 (e.g., the time period with which transparent overlay 130 appears and then disappears).

If it is determined that a transparent overlay selection does occur (block 625—YES), an opaque overlay may be provided (block 635). For example, as previously described, opaque overlay detector 420 may cause transparent overlay 130 to transition to opaque overlay 135. When the overlay becomes opaque, the user may, for example, select from, interact with, access, and/or navigate through opaque overlay 135. Since opaque overlay 135 corresponds to a lower level interface, if the user selects from, interacts with, accesses, and/or navigates through opaque layer 135, the user may be provided with yet another lower level interface.

Although FIG. 6 illustrates an exemplary process 600, in other implementations, additional, fewer, and/or different operations than those described, may be performed.

The foregoing description of implementations provides illustration, but is not intended to be exhaustive or to limit the implementations to the precise form disclosed. Accordingly, modifications to the implementations described herein may be possible. For example, while the description has described a GUI, it will be appreciated that the implementations described herein are applicable to non-graphical interfaces. Additionally, or alternatively, while the user device has been described as including a touch screen, in other implementations, a display, which is not a touch screen, may be utilized. For example, a computer with a display that is operated by a mouse may be utilized. Additionally, or alternatively, a size of the transparent overlay may be a different size than the opaque overlay.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while a series of blocks have been described with regard to the process illustrated in FIG. 6, the order of the blocks may be modified in other implementations. Further, non-dependent blocks may be performed in parallel.

It will be apparent that the device, method, and/or system, described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the device and/or system, or the performing of the method was described without reference to the specific software code—it being understood that software and control hardware can be designed to implement the device, method, and/or system based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:
1. A method comprising:
   displaying, by a user device, a source user interface that includes one or more selectable objects;
   receiving, by the user device, a user input with respect to one of the one or more selectable objects of the source user interface;

obtaining, by the user device, execution flow information associated with the source user interface;

determining, by the user device, in response to the user input, whether a lower level interface, with respect to the one of the one or more selectable objects of the source user interface, exists based on the execution flow information;

displaying, by the user device, the lower level interface, in response to determining that the lower level interface exists for the one of the one or more selectable objects, wherein the lower level interface is displayed as a transparent overlay representative of a user interface that would be displayed if a user were to select from or access the source user interface;

determining, by the user device, whether another user input is received, wherein the other user input indicates that the lower level interface is to be activated;

displaying, by the user device, the lower level interface as an opaque overlay, in response to determining that the other user input is received; and causing, by the user device, the lower level interface, when the lower level interface is displayed as the transparent overlay, to no longer be displayed in response to determining that the other user input is not received within a particular time period, wherein a position of the transparent overlay, a size of the transparent overlay, a transparency level of the transparent overlay, and an activation threshold for the transparent display, are user-configurable.

2. The method of claim 1, further comprising:
displaying the lower level interface as the transparent overlay having a size different from the displaying the lower level interface as the opaque overlay.

3. The method of claim 1, further comprising:
receiving, by the user device, the other user input during a time when the lower level interface is displayed as the transparent overlay.

4. The method of claim 3, wherein the other user input is received on the lower level interface when the lower level interface is displayed as the transparent overlay.

5. The method of claim 1, further comprising:
receiving, by the user device, yet another user input, with respect to the lower level interface displayed as the opaque overlay; and
providing, by the user device, another lower level interface, with respect to the lower level interface in response to the yet another user input.

6. The method of claim 1, wherein the source user interface corresponds to an interface associated with an application, and wherein the source user interface includes a window, and the source user interface is partially hidden by another source user interface that includes a window.

7. The method of claim 1, wherein the one or more selectable objects include one of a menu, a button, an icon, a tab, or a window.

8. The method of claim 1, wherein the user input includes one or more of:
a touch;
proximity of an object to the device;
an audible command;
eye movement; or
brain activity.

9. A device comprising:
one or more memories to store instructions; and
one or more processors to execute the instructions in the one or more memories to:
display a source user interface;
receive a user input with respect to the source user interface;
obtain execution flow information associated with the source user interface;
determine, in response to the user input, whether a lower level interface associated with the source user interface, exists based on the execution flow information;
display the lower level interface, in response to a determination that the lower level interface exists, wherein the lower level interface is displayed as a transparent overlay, and the lower level interface corresponds to an interface that would be displayed if a user were to select from or navigate via the source user interface;
determine whether another user input is received to indicate that the lower level interface is to be activated; and
display the lower level interface as an opaque overlay, in response to a determination that the other user input is received, wherein the opaque overlay permits the user to select from or navigate via the opaque overlay, wherein a position of the transparent overlay, a size of the transparent overlay, a transparency level of the transparent overlay, and an activation threshold for the transparent display, are user-configurable.

10. The device of claim 9, wherein the device comprises a wireless telephone.

11. The device of claim 9, wherein the one or more processors execute the instructions to:
cause the lower level interface, when being displayed as the transparent overlay, to not be displayed, in response to a determination that the other user input is not received within a particular time period.

12. The device of claim 9, wherein the device includes a touch screen to receive the user input and the other user input.

13. The device of claim 9, wherein the other user input is received on the transparent overlay.

14. The device of claim 9, wherein the lower level interface corresponding to the transparent overlay is displayed for a period of time before automatically disappearing unless the other user input is received, and when determining whether the other user input is received, the one or more processors execute the instructions to:
determine whether the lower level interface is being displayed or is no longer being displayed.

15. The device of claim 9, wherein the one or more processors execute the instructions to:
control one or more of a position of the transparent overlay, a size of the transparent overlay, a transparency level of the transparent overlay, or a time period with which the transparent overlay is displayed before no longer displaying the transparent overlay.

16. The device of claim 15, wherein the transparency level of the transparent overlay is such that the user of the device is capable of seeing both the source user interface and the lower level interface.

17. A non-transitory computer-readable storage medium containing instructions executable by at least one processor, the non-transitory computer-readable storage medium storing instructions for:
displaying a source graphical user interface (GUI) that includes one or more selectable objects;
receiving a user selection of one of the one or more selectable objects of the source GUI;
obtaining execution flow information associated with the source GUI;
displaying, in response to the user selection and based on the execution flow information, a lower level GUI, wherein the lower level GUI is displayed as a transparent overlay, and the lower level GUI corresponds to a GUI that would be displayed if a user were to select from or navigate through the one of the one or more selectable objects of the source GUI;

determining whether another user selection is received during a time period that the lower level GUI is displayed, wherein the other user input indicates an activation of the lower level GUI; and displaying the lower level GUI as an opaque GUI, in response to determining that the other user selection is received, wherein a position of the transparent overlay, a size of the transparent overlay, a transparency level of the transparent overlay, and an activation threshold for the transparent display, are user-configurable.

18. The non-transitory computer-readable storage medium of claim 17, further comprising one or more instructions for:

causing the lower level GUI, displayed as the transparent overlay, to automatically disappear, in response to determining that the other user selection is not received during the time period.

19. The non-transitory computer-readable storage medium of claim 18, wherein the source GUI corresponds to a user interface associated with an application or a user interface of a device.

20. The non-transitory computer-readable storage medium of claim 17, wherein a size of the transparent overlay corresponds to a size of the lower level GUI normally displayed if the user were to select from or navigate through the one of the one or more selectable objects of the source GUI.

* * * * *